Dec. 29, 1925.
E. R. CLAYTON ET AL
1,567,492
DRAFT AND STEERING RIG FOR TRAILERS
Filed August 11, 1922
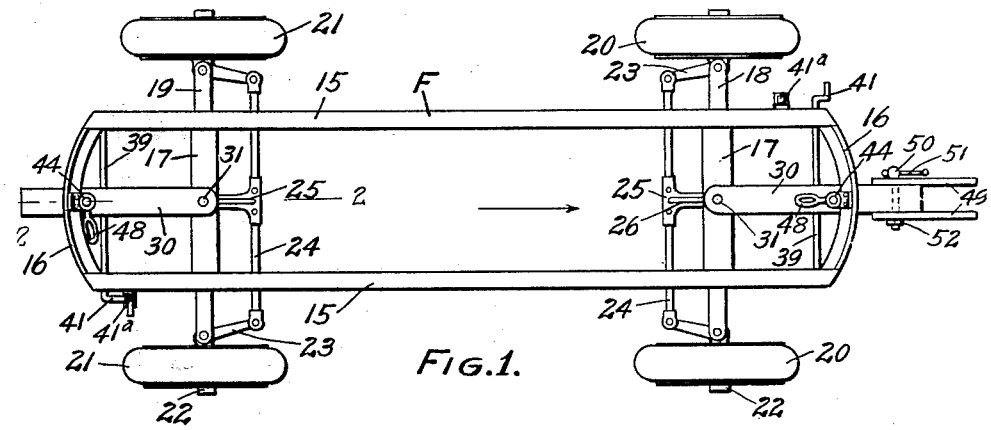
FIG.1.
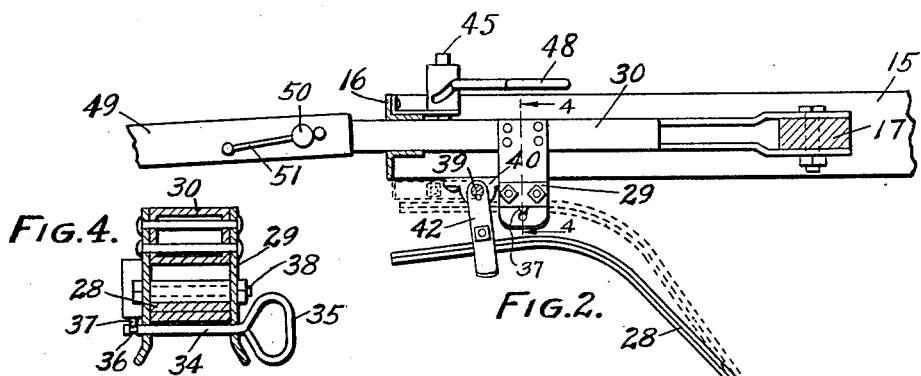
FIG.4.
FIG.2.
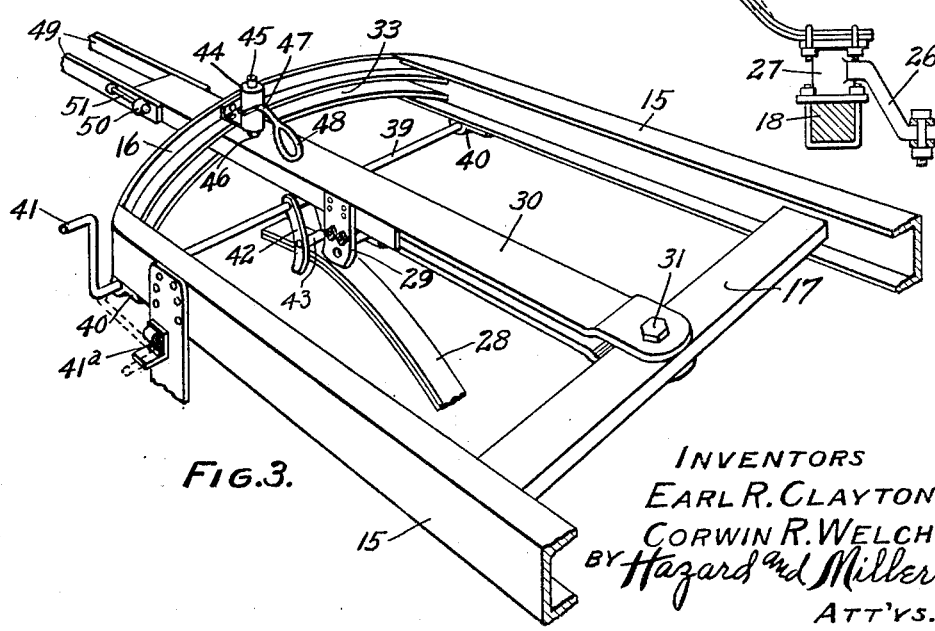
FIG.3.
INVENTORS
EARL R. CLAYTON
CORWIN R. WELCH
BY Hazard and Miller
ATT'YS.

Patented Dec. 29, 1925.

1,567,492

UNITED STATES PATENT OFFICE.

EARL R. CLAYTON AND CORWIN R. WELCH, OF LOS ANGELES, CALIFORNIA.

DRAFT AND STEERING RIG FOR TRAILERS.

Application filed August 11, 1922. Serial No. 581,145.

*To all whom it may concern:*

Be it known that we, EARL R. CLAYTON and CORWIN R. WELCH, citizens of the United States, residing at Los Angeles, in the county of Los Angeles and State of California, have invented new and useful Improvements in Draft and Steering Rigs for Trailers, of which the following is a specification.

Our invention relates to drawn vehicles, commonly known as trailers, and more particularly to a rig therefor by which the trailer is connected to the draft vehicle in a manner to permit steering of the trailer.

It is a purpose of our invention to provide a draft and steering rig of the above described character which allows of the arbitrary steering or non-steering of the wheels of the vehicle, and in its application to a trailer it permits of the steering thereof by the draft vehicle.

Although we will describe only the best form of draft and steering rig embodying our invention, and then point out the novel features thereof in claims, it is to be understood that various changes and modifications may be made without departing from the spirit of the invention and the spirit and scope of the claims appended hereto.

In the accompanying drawings,

Figure 1 is a view showing in top plan a trailer having applied thereto the best form of a draft and steering rig embodying our invention;

Figure 2 is a fragmentary vertical sectional view taken on the line 2—2 of Figure 1;

Figure 3 is a fragmentary perspective view of one end of the trailer shown in Figure 1;

Figure 4 is a vertical sectional view on the line 4—4 of Figure 2.

Similiar reference characters refer to similar parts in each of the several views.

Referring specifically to the drawings and particularly to Figure 1, our invention in its present embodiment is shown as applied to a trailer including a frame or chassis F including side rails 15 and curved end rails 16, transverse bars 17 connecting the side rails between their ends. The chassis F is supported above axles 18 and 19, and front and rear wheels 20 and 21, respectively, are mounted on stub axles 22 provided with arms 23 to which links 24 are connected. The links 24 are in turn pivotally connected to a steering arm 25 at the points indicated at 26, and as clearly shown in Figure 2 the steering arms are rotatably mounted upon axles 18 and 19 by bearings 27. Yieldable spring strips 28 are secured to the bearings 27 at their lower ends, while their upper ends are arranged to be engaged by yokes 29 carried by draft bars 30 to provide an operative connection between the draft bars and steering wheel so that upon movement of the draft bars the steering of the wheels is effected. The draft bars are pivoted upon the transverse beams 17 at the points indicated at 31, and as clearly shown in Figure 2 these bars are extended through slots 33 formed in the end rails 16. The spring strips 28 form a yielding tongue for the steering gear.

The upper ends of the spring strips 28 are movable to engage or disengage the yokes 29 and to thereby connect or disconnect the draw bar 30 to or from the steering arms 26. The tendency of the upper ends of the strips 28 is to repose between the arms of yokes 29 to provide an operative connection between the draw bars and the steering arms. In this position of the strips, they are held against accidental displacement from the yokes by means of pins 34 extended through suitable openings formed in the arms of the yoke, as clearly shown in Figure 4. One end of each pin 34 is provided with a handle 35; at its opposite end, it is formed with an annular groove 36 adapted to be engaged by a spring latch 37 carried by one arm of the yoke.

For moving the upper ends of the strips 28 to disengaging position with respect to the yokes 29, shafts 39 are journaled in bearings 40 carried by the side rails 15. One end of each shaft 39 is provided with a crank 41, while keyed to the shaft between its ends and at a point opposite to the yoke 29 is an actuating member 42 which, as clearly shown in Figure 3, comprises spaced arms connected by a bar 43. The arrangement of the actuating member 42 is such that by rotating the shaft 39 through the medium of the crank 41 it can be moved from the position shown in dotted lines in Figure 3 to that shown in solid lines, whereby the upper end of the strip 28 will be engaged and forced downwardly so as to clear the yoke 29. The friction of the parts will hold the crank 41 in its upward position as shown in Fig. 3 when the bar 43 is on a dead center with the shaft 39. In the dotted line position it will be clear that the actuating device disengages the spring strips so as to allow the latter to spring to position in the yoke 29. In this position the shaft 39 can be locked against movement by means of a latch 41ª engaging the handle 41.

Referring now to Figure 3, we have here shown one form of apparatus for effecting a locking of either draw bar 30 against pivotal movement upon the frame F, as it is necessary that either draw bar be locked against movement when not in use. To this end, a sleeve 44 is fixed to the corresponding end rail 16 and slidably mounted in this sleeve is a locking pin 45 which is adapted to engage within an aperture 46 formed in the draw bar 30. A latch 47 is operable by means of a handle 48 in a suitable slot formed in the sleeve 44 to engage or disengage and to thereby hold the pin in locking position with respect to the draw bar.

The front draw bar of the trailer in Figure 1 is connected to hitch links 49, the latter being attached to the rear end of a draft vehicle. These hitch links are provided with openings adapted to register with an opening formed on the corresponding draw bar to receive a bolt 50 having an apertured head to slidably receive an operating rod 51. A nut 52 is carried by the opposite end of the bolt so that when the rod 51 is operated a secure clamping of the links to the draw bar can be effected.

In practice, it is desirable, although not necessary, that the front and rear wheels 20 and 21 be provided with the steering mechanism described so that either of said wheels can be steered, depending upon in which direction the trailer is being moved. With the trailer moving in the direction of the arrow in Figure 1, it will be clear that the steering rig of the rear wheels 21 is locked and, consequently, inactive. This locking is effected by actuating the latch 47 to allow the pin 45 to engage the aperture 46 of the corresponding draw bar 30, thereby locking the bar against any pivotal movement. With the bar so locked, the upper end of the corresponding spring strip 28 engages within the corresponding yoke 29 so that a rigid connection is provided between the draw bar and the steering arm 26. This obviously prevents any possible movement of the steering mechanism for the rear wheels.

When the vehicle end of the trailer is connected to a draft vehicle, it is, of course, necessary that the front wheels 20 be steered, and to this end the latch pin 45 is moved to releasing position with respect to the corresponding draw bar 30 while the draw bar is operatively connected to the corresponding steering arm 26 by allowing the spring strip 28 to repose within the yoke 29. In this position of the strip 28, it will be understood that the actuating device 42 occupies the dotted line position shown in Figure 2, so that the lateral movement of the strip 28 under the action of the draw bar 30 is unrestricted. As the hitch links 49 are connected to the draft vehicle, it will be clear that an actuation of the draw bar 30 is effected to cause a steering of the front wheels 20.

If it is desired to move the trailer in the opposite direction from that indicated by the arrow in Figure 1, and with the draft vehicle still connected to the forward draw bar 30, the rig of the front wheels 20 is locked against movement so as to prevent steering of these wheels, while the steering rig of the rear wheels 21 is released to permit of a steering of these wheels. This is effected by moving the pin 45 to releasing position with respect to the draw bar 30 without disturbing the connection between the draw bar and the spring strip 28. Obviously, by manual movement of the draw bar 30, the rear wheels 21 can be moved to effect a steering of the trailer under the pushing action of the draft vehicle.

We claim:

1. In combination, a vehicle including wheels capable of being steered, steering mechanism for the wheels including a yielding tongue, a draw bar pivoted on the vehicle, and manually operable means for rigidly connecting the resilient member to or disconnecting the same from said draw bar.

2. A draft and steering rig comprising a draft bar adapted for pivotal movement upon the frame of a vehicle, a resilient member normally urged to a position in which it is rigidly connected to the draft bar, said resilient member being adapted for connection to the steerable wheels of a vehicle, and means for moving the resilient member against its urging means to cause the same to be disconnected from the draft bar.

3. A draft and steering rig comprising a draft bar adapted for pivotal movement upon the frame of a vehicle, a resilient member normally urged to a position in which it is rigidly connected to the draft bar, said resilient member being adapted for connection to the steerable wheels of a vehicle, means for moving the resilient member against the urging means to cause the same to be disconnected from the draft bar, and means adapted to be carried by a fixed part of a vehicle for locking the draft bar against movement on its pivot.

4. A draft and steering rig for trailing vehicles comprising a draft bar adapted to be mounted on a vehicle for pivotal movement, a yoke carried by the bar, a resilient member adapted for operative connection with the steerable wheels of the vehicle, said member being normally urged to a position where it engages said yoke, and an actuating device adapted to engage the resilient member for moving the latter clear of said yoke.

5. A draft and steering rig for trailing vehicles comprising a draft bar adapted to be mounted on a vehicle for pivotal movement, a yoke carried by the bar, a resilient member adapted for operative connection with the steerable wheels of the vehicle, said member being normally urged to a position where it engages said yoke, a shaft, an actuating device fixed to the shaft and arranged so that when said shaft is rotated the device is adapted to engage the resilient member to remove the latter from said yoke.

6. In combination, a vehicle including wheels capable of being steered, a steering mechanism for the wheels including a resilient member, a draw bar pivoted on the vehicle, a yoke carried by the draw bar and normally engaged by the resilient member to provide an operative connection between the steering mechanism and the draw bar, and a crank for moving the resilient member out of engagement with said yoke.

7. In combination, a vehicle including wheels capable of being steered, a steering mechanism for the wheels including a resilient member, a draw bar pivoted on the vehicle, means for connecting the resilient member to the draw bar to permit the steering mechanism to be operated by the draw bar, and manually operable means for disconnecting the resilient member from the draw bar and in a manner to allow movement of the resilient member.

In testimony whereof we have signed our names to this specification.

EARL R. CLAYTON.
CORWIN R. WELCH.